(12) United States Patent
Kanzaki (10) Patent No.: US 11,630,286 B2
(45) Date of Patent: Apr. 18, 2023

(54) LENS UNIT AND CEMENTED LENS (71) Applicant: NIDEC SANKYO CORPORATION, Nagano (JP)

(72) Inventor: Yosuke Kanzaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 723 days.

(21) Appl. No.: 16/553,568

(22) Filed: Aug. 28, 2019

(65) Prior Publication Data

US 2020/0073077 A1 Mar. 5, 2020

(30) Foreign Application Priority Data

Aug. 29, 2018 (JP) .............................. JP2018-160155

(51) Int. Cl.
| | |
|---|---|
| *G02B 9/00* | (2006.01) |
| *G02B 13/00* | (2006.01) |
| *G02B 7/02* | (2021.01) |
| *G02B 3/04* | (2006.01) |
| *G02B 13/18* | (2006.01) |
| *G02B 1/04* | (2006.01) |

(52) U.S. Cl.
CPC ........... *G02B 13/006* (2013.01); *G02B 1/041* (2013.01); *G02B 3/04* (2013.01); *G02B 7/021* (2013.01); *G02B 7/025* (2013.01); *G02B 13/18* (2013.01)

(58) Field of Classification Search
CPC . G02B 1/041; G02B 3/04; G02B 3/00; G02B 7/021; G02B 7/025; G02B 13/18; G02B 13/006
USPC .................................................. 359/793, 796
See application file for complete search history.

(56) References Cited

U.S. PATENT DOCUMENTS

| | | | | |
|---|---|---|---|---|
| 2010/0321801 | A1* | 12/2010 | Tokunaga | ................ G02B 3/00 359/796 |
| 2015/0323708 | A1* | 11/2015 | Hashimoto | .............. G02B 1/04 359/718 |
| 2018/0106984 | A1* | 4/2018 | Tang | .................... G02B 13/006 |
| 2018/0129017 | A1 | 5/2018 | Huang et al. | |

FOREIGN PATENT DOCUMENTS

| | | |
|---|---|---|
| JP | 2014119707 A | 6/2014 |
| JP | 2017037155 A *  | 2/2017 |
| JP | 2018097294 A | 6/2018 |

OTHER PUBLICATIONS

JPO Notification of Reasons for Rejection for corresponding JP Application No. 2018-160155; dated Apr. 26, 2022.

* cited by examiner

*Primary Examiner* — Mahidere S Sahle
(74) *Attorney, Agent, or Firm* — Cantor Colburn LLP (57) ABSTRACT

A cemented lens may include a first lens and a second lens connected via an adhesive layer. The first lens may include a convex surface facing toward the second lens, and a first flange surrounding an outer circumference of the convex surface. The second lens may include a concave surface connected to the convex surface, and a second flange surrounding an outer circumference of the concave surface. One of the first and second flange may include a projection protruding toward an other of the first and second flange. The other of the first and second flange may include an opposed portion opposed to a side surface of the projection Ga is a distance between the convex surface and the concave surface, and Gb is a distance between the side surface and the opposed portion, and the following expression: Gb<Ga may be satisfied.

11 Claims, 7 Drawing Sheets

LENS UNIT AND CEMENTED LENS

CROSS-REFERENCE TO RELATED APPLICATION

The present application claims priority under 35 U.S.C. § 119 to Japanese Application No. 2018-160155 filed Aug. 29, 2018, the entire content of which is incorporated herein by reference.

FIELD OF THE INVENTION

At least an embodiment of the present invention relates to a lens unit and a cemented lens, and pertains to, for example, a lens unit provided with a plurality of lenses including a cemented lens, and a lens barrel holding the plurality of lenses, and to such a cemented lens.

BACKGROUND

In recent years, in the lens unit market, a demand for higher resolution has been increasing. In order to obtain high resolution, it is necessary to correct chromatic aberration of magnification, therefore, a cemented lens in which lenses are connected together with an adhesive is provided in a lens unit (see, for example, Japanese Unexamined Patent Application Publication No. 2014-119707). In the cemented lens, connection surfaces (lens surfaces) are connected together with the adhesive, and it is necessary that a clearance (an adhesive layer) with a certain length or more is provided between the connection surfaces in order to inhibit peeling of the adhesive layer.

Incidentally, it is difficult to perform centering of the certain number or more of lenses due to the foregoing adhesive layer, i.e., the clearance with a certain length or more, and coma aberration is not completely corrected because of center misalignment of the lenses, which may prevent the optical performance from improving. Therefore, in order to improve the optical performance with the increase in resolution, a countermeasure technique has been demanded.

At least an embodiment of the present invention is thus made in view of the above situation, and is directed to provide a technique that can inhibit peeling of an adhesive layer of a cemented lens and can perform centering of lenses more precisely.

SUMMARY

A lens unit according to at least an embodiment of the present invention includes: a plurality of lenses and a lens barrel configured to house the plurality of lenses. The plurality of lenses include a cemented lens including a first cemented lens element and a second cemented lens element connected to the first cemented lens element via an adhesive layer. The first cemented lens element is a lens including a convex lens surface facing toward the second cemented lens element, and a first flange surrounding an outer circumference of the convex lens surface. The second cemented lens element is a lens including a concave lens surface connected to the convex lens surface of the first cemented lens element by the adhesive layer, and a second flange surrounding an outer circumference of the concave lens surface. One of the first flange and the second flange has a projection protruding toward the other of the first flange and the second flange. The other of the first flange and the second flange has an opposed portion opposed to a side surface of the projection. When a gap Ga is provided between the convex lens surface and the concave lens surface, and when a gap Gb is provided between the side surface of the projection and the opposed portion, the following relational expression: Gb<Ga is satisfied by Ga and Gb. Since the gap Gb having a length smaller than the gap Ga is present, a gap with a certain length or more can be provided between the convex lens surface and the concave lens surface (between connection surfaces) and centering of the lenses can be performed by use of the gap Gb. Therefore, peeling of the adhesive layer can be inhibited, and centering of the lenses can be performed more precisely. Consequently, the occurrence of problems such as diffuse reflection, tarnishing, whitening, and a damage of the cemented lens can be inhibited. In addition, centering of the lenses can be performed precisely, and the high resolution of the lens unit can be attained by improvement of optical performance.

The first cemented lens element and the second cemented lens element are plastic lenses. One of the first cemented lens element and the second cemented lens element is in contact with an inner circumferential surface of the lens barrel, and the other of the first cemented lens element and the second cemented lens element is not in contact with the inner circumferential surface of the lens barrel. A gap may be present between the side surface of the projection and the opposed portion. The first cemented lens element and the second cemented lens element are plastic lenses. One of the first cemented lens element and the second cemented lens element is in contact with an inner circumferential surface of the lens barrel, and the other of the first cemented lens element and the second cemented lens element is not in contact with the inner circumferential surface of the lens barrel. In a case where environmental temperature rises and the cemented lens elements are expanded, one of the cemented lens elements is in contact with the inner circumferential surface of the lens barrel; therefore, expansion is prevented by the lens barrel. Consequently, expansion and distortion occur. The other of the cemented lens elements is not in contact with the lens barrel, therefore being expanded without disturbance by the lens barrel. As a result, when the side surface of the projection is in contact with the opposed portion, peeling of the adhesive layer is highly likely to occur due to dislocation caused by such expansion. Meanwhile, with the structure according to at least an embodiment of the present invention, when environmental temperature rises, the first cemented lens element and the second cemented lens elements expand. Even in such a case, the gap is preset between the side surface of the projection and the opposed portion. Therefore, peeling of the adhesive layer due to dislocation caused by the aforementioned expansion can be inhibited.

An adhesive reservoir recessed toward an opposite side to one of the first flange and the second flange may be formed in the other of the first flange and the second flange, and a side surface of the adhesive reservoir may be the opposed portion opposed to the side surface of the projection. When the concave lens surface and the convex lens surface are overlaid, the excess adhesive is stored in the adhesive reservoir. Therefore, the sufficient amount of adhesive can be applied so that peeling of the adhesive or air bubbles do not occur, and in addition, the adhesive can be prevented from flowing to the outside of the lens.

The adhesive reservoir may be circumferentially and continuously formed in an annular shape so as to surround the lens surface of the other of the first cemented lens element and the second cemented lens element. Centering of the lenses can be performed by circumferentially rotating one of the lenses. Further, the adhesive reservoir is formed in an annular shape and thus the adhesive evenly expands toward the flanges; therefore, peeling of the adhesive layer can be further inhibited. In addition, the adhesive can be prevented from leaking circumferentially and throughout the lens to the outside of the lens.

The projection may be formed at a plurality of locations spaced apart circumferentially at intervals. When the excess adhesive is in an overflow state from the adhesive reservoir, the excess adhesive can be stored in a space between the projections.

A positioning protrusion may be formed on one of the first flange and the second flange and located radially outward of the projection or the opposed portion, the positioning protrusion protruding toward the other of the first flange and the second flange and positioning the first cemented lens element and the second cemented lens element in an optical axis direction. The gap between the first cemented lens element and the second cemented lens element in the optical axis direction can be highly precisely controlled.

When a gap Gc is provided between one inner surface located radially inward of the projection and another inner surface located inward of the opposed portion, and when a gap Gd is provided between a boundary portion between the one inner surface and the concave lens surface, and a boundary portion between the other inner surface and the convex lens surface, the following relational expression: Ga<Gd<Gc may be satisfied by Ga, Gc, Gd. In general, the adhesive shrinks when curing. At this time, the adhesive is likely to be pulled (shrink) toward the adhesive reservoir having a wide gap (clearance) and thus such shrinkage may cause peeling (interruption of flowing) of the adhesive. However, as seen from the aforementioned relation, the gap is designed to increase toward the adhesive reservoir. Therefore, peeling of the adhesive can be inhibited and the occurrence of problems such as diffuse reflection, tarnishing, whitening, and a damage of the cemented lens can be inhibited.

At least an embodiment of the present invention provides a cemented lens including a first cemented lens element and a second cemented lens element connected to the first cemented lens element via an adhesive layer. The first cemented lens element is a lens including a convex lens surface facing toward the second cemented lens element, and a first flange surrounding an outer circumference of the convex lens surface. The second cemented lens element is a lens including a concave lens surface connected to the convex lens surface of the first cemented lens element by the adhesive layer, and a second flange surrounding an outer circumference of the concave lens surface. One of the first flange and the second flange has a projection protruding toward the other of the first flange and the second flange. The other of the first flange and the second flange has an opposed portion opposed to a side surface of the projection. When a gap Ga is provided between the convex lens surface and the concave lens surface, and when a gap Gb is provided between the side surface of the projection and the opposed portion, the following relational expression: Gb<Ga is satisfied by Ga and Gb.

According to at least an embodiment of the present invention, peeling of an adhesive layer of a cemented lens can be inhibited and centering of lenses can be performed more precisely.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, modes for carrying out the invention (hereinafter referred to as "embodiments") will be described with reference to the drawings.

Figure 1A:
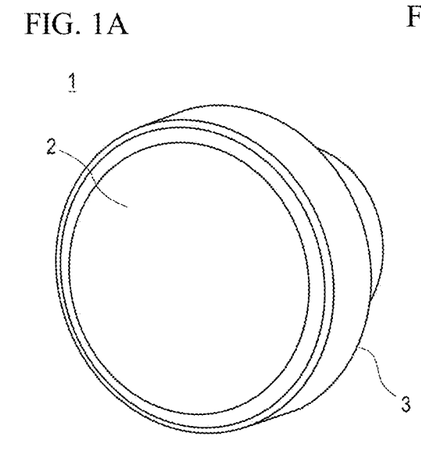
FIG. 1A, FIG. 1B, and FIG. 1C are diagrams each illustrating a lens unit according to an embodiment.
Figure 1B:
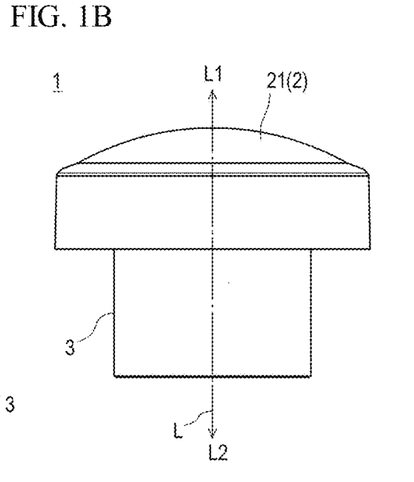
Figure 1C:
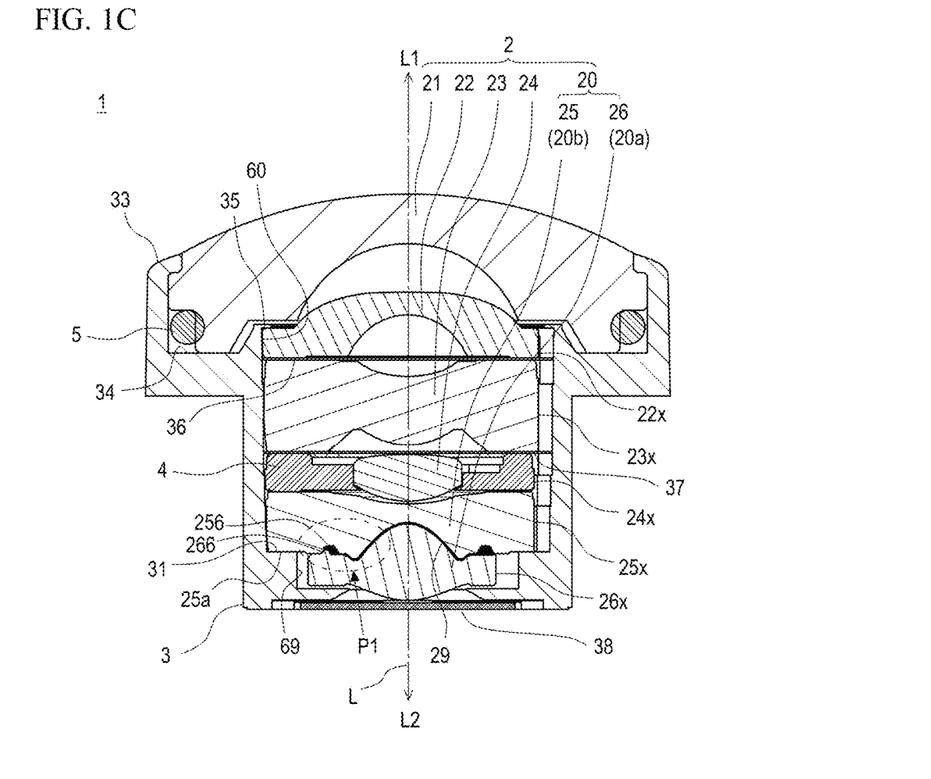

FIG. 1A to FIG. 1C illustrate a lens unit 1 according to an embodiment of the present invention. FIG. 1A is a perspective view illustrating the entire lens unit. FIG. 1B is a plan view and FIG. 1C is a vertical cross-sectional view.

The lens unit 1 is a lens assembly mounted in an on-vehicle peripheral surveillance camera, a surveillance camera, a door phone, or the like. Note that "object side L1" and "image side L2" in the present embodiment are referred to as the object side and the image side in the direction of an optical axis L, and "optical axis direction" means a direction parallel to the optical axis L.

(Overall Configuration)

The lens unit 1 includes a wide-angle lens 2 formed of a plurality of lenses, and a lens barrel 3 configured to house the wide-angle lens 2. The wide-angle lens 2 includes six lenses of a first lens 21, a second lens 22, a third lens 23, a fourth lens 24, a fifth lens 25, and a sixth lens 26 disposed in close contact along the optical axis L from the object side L1 to the image side L2.

Additionally, in the present embodiment, a light shielding sheet 36 configured to prevent light from entering toward the image side is disposed in close contact between the second lens 22 and the third lens 23, and a diaphragm 37 is disposed in close contact between the third lens 23 and the fourth lens 24 (a glass lens holder 4). Moreover, an infrared cut filter 38 is attached to an opening of the lens barrel 3, which is located on the image side L2, so as to be opposed to the sixth lens 26.

Of the lenses configuring the wide-angle lens 2, the first lens 21 is disposed closest to the object side L1. The second lens 22 is located on the image side L2 of the first lens 21. The third lens 23 is located on the image side L2 of the second lens 22. The fourth lens 24 is located on the image side L2 of the third lens 23. The fourth lens 24 is arranged in the lens barrel 3 while being press-fitted and fixed into a lens holder 4 of resin and further being supplementarily fixed with an adhesive. The fifth lens 25 is located on the image side L2 of the fourth lens 24. The sixth lens 26 is located on the image side L2 of the fifth lens 25. The fifth lens 25 and the sixth lens 26 configure a cemented lens 20. In other words, the sixth lens 26 is a first cemented lens element 20a and the fifth lens 25 is a second cemented lens element 20b. The first cemented lens element 20a (the sixth lens 26) and the second cemented lens element 20b (the fifth lens 25) are fixed with an adhesive and thus configure the cemented lens 20.

A glass lens is used as the first lens 21 from the viewpoint of preventing an object-side lens surface of the first lens 21 from being easily scratched even when the object-side lens surface of the first lens 21 located closest to the object side is exposed. Plastic lenses are used as the second lens 22, the third lens 23, the fifth lens 25, and the sixth lens 26 in terms of superiority in workability and economic efficiency of the lenses. A glass lens is used as the fourth lens 24 from the viewpoint that can inhibit the change of a refractive index with respect to temperature changes.

In addition, the wide-angle lens 2 of the lens unit 1 according to the present embodiment includes the aforementioned six lenses. Alternatively, the number of lenses is not limited. Further, the materials of the lenses are not limited.

The lens barrel 3 is a resin cylindrical lens frame, and an inner circumferential surface 60 of the lens barrel 3 is formed extending toward the image side L2 along an outer circumferential surface of each of the lenses configuring the wide-angle lens 2. A sixth lens housing portion 69 having a diameter smaller than the inner circumferential surface 60 is formed at a portion of the inner circumferential surface 60, which is located on the image side L2. The sixth lens 26 is arranged in the sixth lens housing portion 69.

A plurality of press-fitting protrusions 70 are formed circumferentially at equal intervals on the inner circumferential surface 60 into a protruded shape (bulged shape) protruding radially inward. Of the lenses configuring the wide-angle lens 2, the second lens 22, the third lens 23, the lens holder 4 (the fourth lens 24), and the fifth lens 25 are press-fitted to the press-fitting protrusions 70 on the inner circumferential surface 60. In other words, the press-fitting protrusions 70 function as a press-fitting holding portion for the second lens 22, the third lens 23, the lens holder 4 (the fourth lens 24), and the fifth lens 25. In addition, the sixth lens 26 is arranged inside the inner circumferential surface 60 without contacting the inner circumferential surface 60.

Further, a flat portion 25a is formed on a circumferential end of a surface of the fifth lens 25, which is located on the image side L2, and the flat portion 25a is placed on an annular placement surface 31 of the lens barrel 3 located on the image side L2 of the lens barrel 3 and extending circumferentially and inwardly. Furthermore, the second lens 22 has a circumferential edge of a surface located on the object side L1, and the circumferential edge is locked to a swaging portion 35 provided at an end portion of an object-side inner circumferential surface of the lens barrel 3.

Thus, the second lens 22, the third lens 23, the lens holder 4 (the fourth lens 24), the fifth lens 25, and the sixth lens 26 are positioned in the optical axis L direction. Additionally, an O-ring 5 is mounted in a circumferential portion of the first lens 21. Afterward, the first lens 21 in which the O-ring 5 is mounted is mounted in an annular groove portion 34. Thereafter, the circumferential edge of the first lens 21 is locked to a swaging portion 33 provided on an object-side end portion of the lens barrel 3. In such a process, the first lens 21 is positioned in the optical axis L direction.

Figure 2:
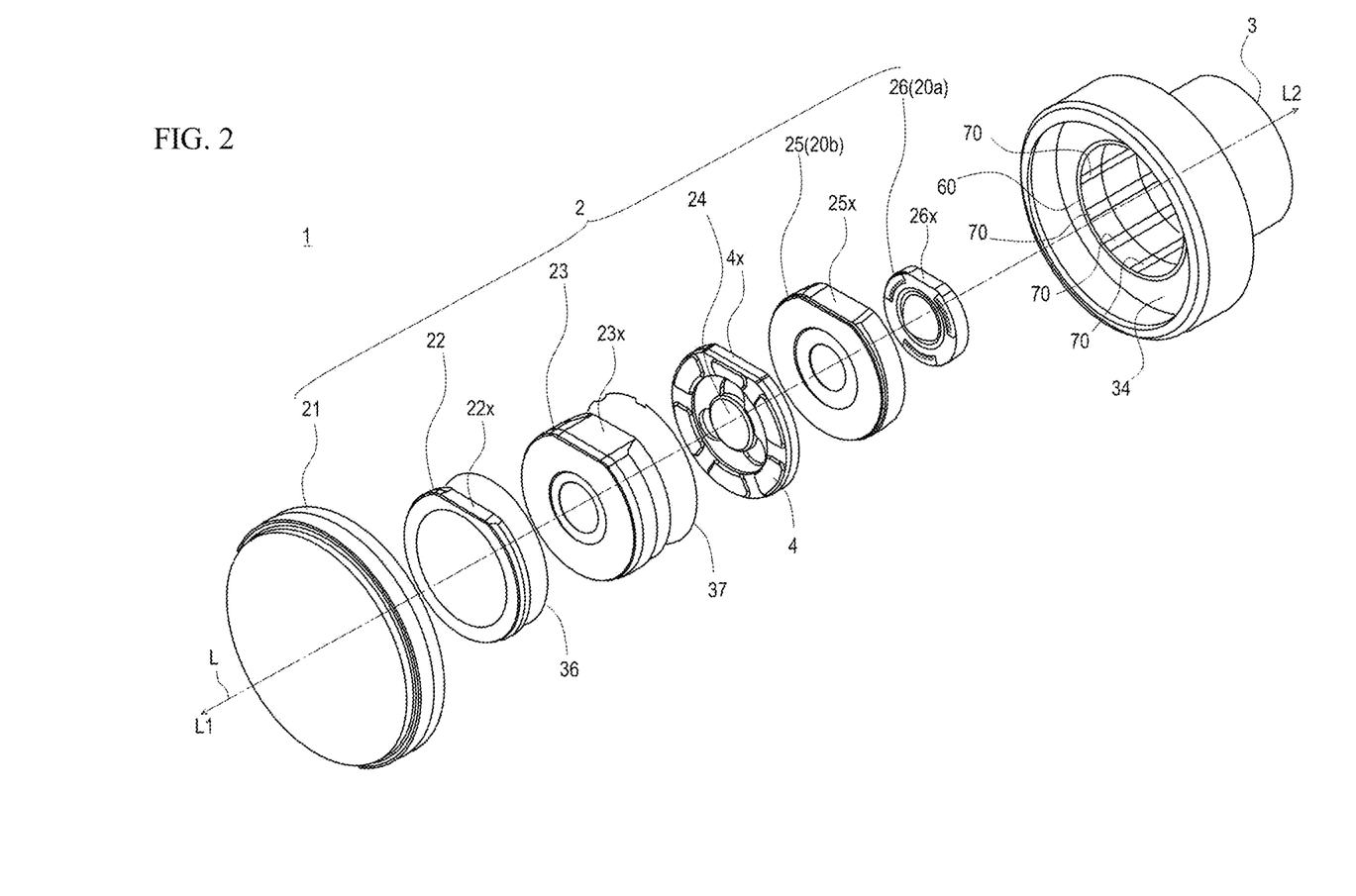
FIG. 2 is an exploded perspective view of the lens unit according to the embodiment.

Here, from the viewpoint of preventing the second lens 22, the third lens 23, the lens holder 4 (the fourth lens 24), the fifth lens 25, and the sixth lens 26 from being inserted in a wrong order, the closer the lens is located to the image side L2, the smaller the outer diameter is. Thus, the closer the lens is located to the image side L2, the smaller the inner circumferential surface 60 is formed. In addition, D-cut portions 22x, 23x, 4x, 25x, 26x are respectively formed on the second lens 22, the third lens 23, the lens holder 4 (the fourth lens 24), the fifth lens 25, and the sixth lens 26 in a right region in FIG. 1C or on the upper side in FIG. 2.

(Structure of Cemented Lens)

Next, the structure of the cemented lens 20, i.e., the structure of the fifth lens 25 (the second cemented lens element 20b) and the sixth lens 26 (the first cemented lens element 20a) will be described with reference to FIGS. 3A and 3B to FIG. 5.

Figures 3A, 3B:
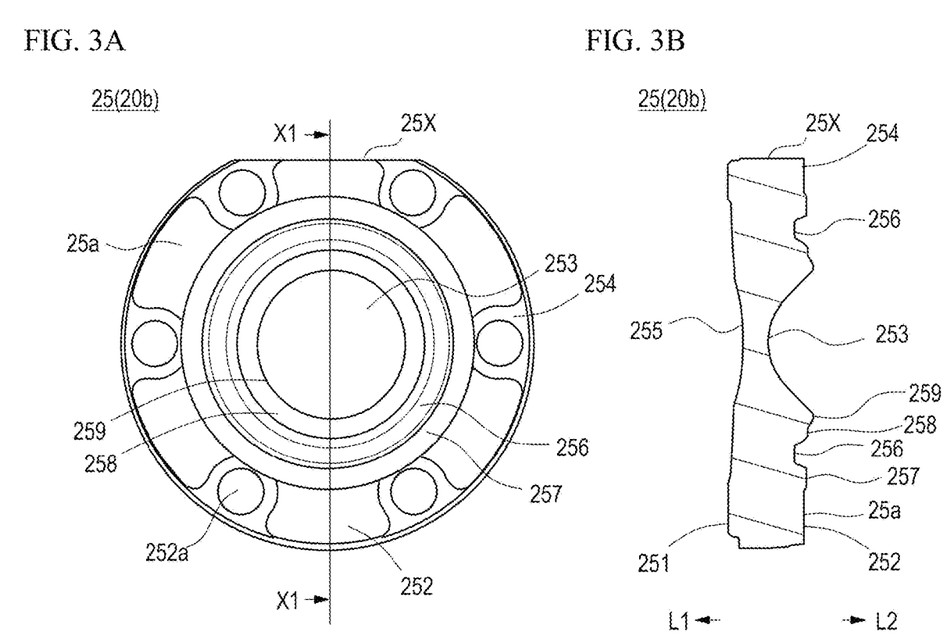
FIG. 3A and FIG. 3B are diagrams each illustrating a fifth lens according to the embodiment.

FIGS. 3A and FIG. 3B are drawings illustrating the fifth lens 25 (the second cemented lens element 20b). FIG. 3A is a bottom view illustrating a surface (an image-side surface 252) of the fifth lens 25, which is located on the image side L2, and FIG. 3B illustrates a cross-section taken along the line X1-X1.

The fifth lens 25 is structured such that a lens surface on the object side L1 is a concave-shaped object-side concave lens surface 255 and a lens surface on the image side L2 is a concave-shaped image-side concave lens surface 253. A second flange 254 is integrally formed on the outer circumferential side of the image-side concave lens surface 253 and the object-side concave lens surface 255 while surrounding the image-side concave lens surface 253 and the object-side concave lens surface 255. In addition, the image-side concave lens surface 253 is a concave lens surface connected to an object-side convex lens surface 263 of the sixth lens 26 described below.

An adhesive reservoir 256, a contact surface 257 located outward of the adhesive reservoir 256, an inner surface 258 located inward of the adhesive reservoir 256, a protruded portion 259 that is a boundary portion between the inner surface 258 and the image-side concave lens surface 253 are formed on the image-side surface 252 of the second flange 254. In the present embodiment, the adhesive reservoir 256 is formed in an annular recessed shape.

The adhesive reservoir 256 is recessed, for example, by about 0.4 mm, and projections 266 described below are fitted into the adhesive reservoir 256. The adhesive reservoir 256 is not limited to a recessed shape. As long as the adhesive reservoir 256 is formed in a shape such that a certain space for storing an adhesive is formed in a state where the projections 266 are fitted into the adhesive reservoir 256, the adhesive reservoir 256 may be formed in, for example, a stepped shape stepped downward toward the object side L1.

Further, the flat portion 25a is formed in a region outward of the contact surface 257 while being slightly recessed from the contact surface 257 toward the object side L1. In a connected state as illustrated in FIG. 1C, the flat portion 25a is placed in contact with the placement surface 31 of the lens barrel 3. Furthermore, a plurality of circular pin contact portions 252a, with which extrusion pins used for taking out the fifth lens 25 from a mold at the time of molding the fifth lens 25 are brought into contact, are formed in the region outward of the contact surface 257.

Figure 4A:
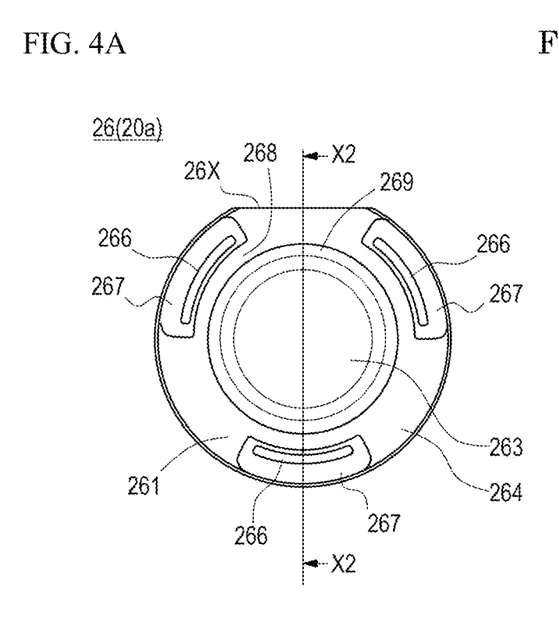
FIG. 4A and FIG. 4B are diagrams each illustrating a sixth lens according to the embodiment.
Figure 4B:
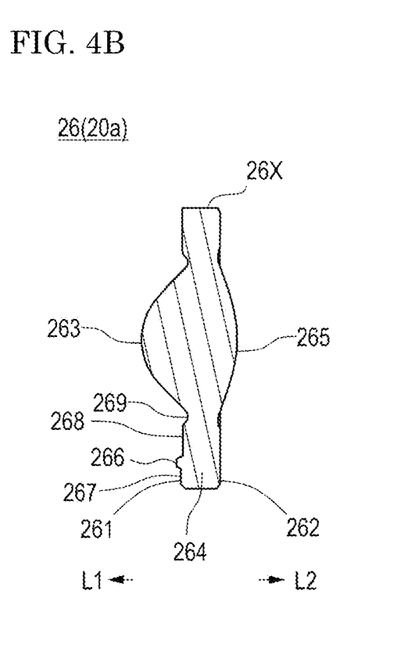

FIG. 4A and FIG. 4B are drawings illustrating the sixth lens 26 (the first cemented lens element 20a). FIG. 4A is a plan view illustrating a surface (an object-side surface 261) of the sixth lens 26, which is located on the object side L1, and FIG. 4B illustrates a cross-section taken along the line X2-X2.

The sixth lens 26 is structured such that a lens surface on the object side L1 is the convex-shaped object-side convex lens surface 263 and a lens surface on the image side L2 is a convex-shaped image-side convex lens surface 265. A first flange 264 is integrally formed on the outer circumferential side of the image-side convex lens surface 265 and the object-side convex lens surface 263 while surrounding the image-side convex lens surface 265 and the object-side convex lens surface 263. In addition, the object-side convex lens surface 263 is a convex lens surface connected to the image-side concave lens surface 253 of the fifth lens 25.

A positioning portion configured to position the fifth lens 25 and the sixth lens 26 in the optical axis L direction is formed on the object-side surface 261 of the first flange 264. The positioning portion is formed as a plane on which arc-shaped positioning protrusions 267 slightly protruded toward the object side L1 are provided at 120 degree intervals. Additionally, the circular arch-shaped projections 266 projecting with a predetermined length are formed on each of the positioning protrusions 267. Moreover, an inner surface 268 located inward of the positioning protrusions 267 and a recessed portion 269 that is a boundary portion between the inner surface 268 and the object-side convex lens surface 263 are formed on the object-side surface 261 of the first flange 264. The positioning protrusions 267 are formed at three locations at equal intervals in the present embodiment. Likewise, the projections 266 are formed at three locations in the present embodiment.

The projection 266 is formed in a substantially trapezoidal shape in cross section, and the projection 266 projects, for example, about 0.2 mm. In addition, the projections 266 are inserted into the adhesive reservoir 256 of the fifth lens 25 when the fifth lens 25 and the sixth lens 26 are connected.

Figure 5:
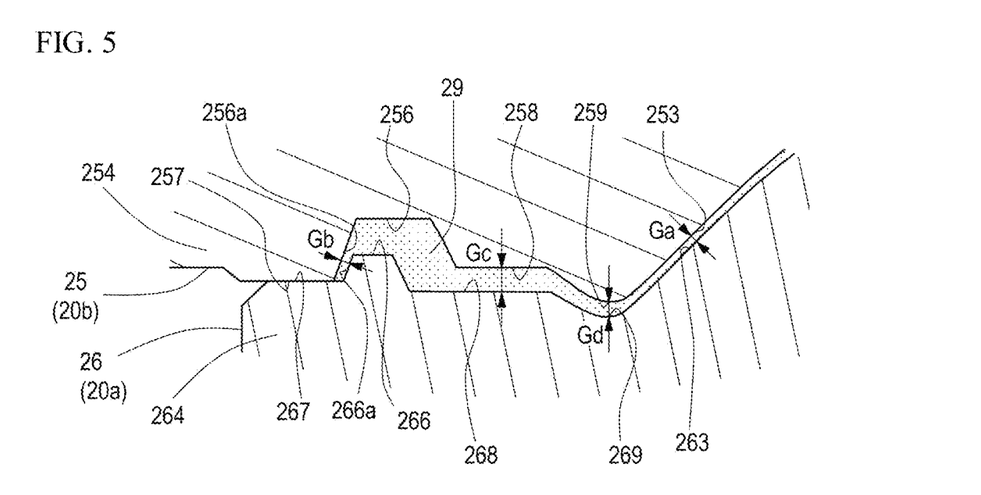
FIG. 5 is an enlarged view of a region P1 of FIG. 1C according to the embodiment.

The connected state of the fifth lens 25 and the sixth lens 26 will be described with reference to FIG. 5. FIG. 5 is an enlarged view of a region P1 of FIG. 1C.

A gap Ga (clearance) with a certain length or more is provided between the image-side concave lens surface 253 of the fifth lens 25 (i.e., the second cemented lens element 20b) and the object-side convex lens surface 263 of the sixth lens 26 (the first cemented lens element 20a). The image-side concave lens surface 253 and the object-side convex lens surface 263 are connected together with an adhesive that is an adhesive layer 29 provided in the gap Ga. The thickness of the adhesive layer 29 in the gap Ga is, for example, about 5 μm to about 20 μm. In addition, the gap Ga is an interval in a direction in which the image-side concave lens surface 253 and the object-side convex lens surface 263 are opposed to each other. The adhesive is, for example, a UV curable adhesive and may be made of a material having elasticity after curing.

The adhesive layer 29 is formed up to the connected portion (the gap Ga) of the object-side convex lens surface 263 and the image-side concave lens surface 253 and to the position of the adhesive reservoir 256 located radially outward of the connected portion. In other words, the adhesive layer 29 is formed in a lens surface connection region in which the object-side convex lens surface 263 and the image-side concave lens surface 253 are opposed and connected to each other, a fitting region in which the projections 266 are fitted into the adhesive reservoir 256, and an intermediate region between the lens surface connection region and the fitting region (in a region in which the inner surface 258 of the fifth lens 25 and the inner surface 268 of the sixth lens 26 are opposed to each other). In addition, since the adhesive reservoir 256 is a space in which the excess adhesive is to be stored, the space is not necessarily entirely filled with the adhesive and may contain air.

The contact surface 257 of the fifth lens 25 is brought into contact with the positioning protrusions 267 of the sixth lens 26, and thus the fifth lens 25 and the sixth lens 26 are positioned in the optical axis L direction. Further, the contact surface 257 and the positioning protrusions 267 are flat surfaces orthogonal to the optical axis L. Therefore, the positional accuracy of the fifth lens 25 and the sixth lens 26 in the optical axis direction, in particular, a gap in the optical axis direction between the center of the object-side convex lens surface 263 and the center of the image-side concave lens surface 253 can be highly accurately controlled.

The side surface of the recessed adhesive reservoir 256 is an inclined surface. In other words, a surface extending inward from the contact surface 257 is the inclined surface that is an opposed portion 256a opposed to side surfaces 266a located outward of each of the projections 266. A gap Gb (clearance) with a certain length or more is provided between the opposed portion 256a and the side surface 266a located outward of the projection 266. The length of the gap Gb is, for example, from about 1 μm to about 5 μm. In addition, the gap Gb is an interval in a direction in which the side surfaces 266a and the opposed portion 256a are opposed to each other.

Further, a gap Gc (clearance) with a certain length or more is provided between the inner surface 258 (one inner surface) located radially inward of the projection 266 and the inner surface 268 (another inner surface) located inward of the adhesive reservoir 256 that is the opposed portion 256a. Furthermore, the length of the gap Gc (the thickness of the adhesive layer) is, for example, from about 30 μm to about 50 μm. In addition, the gap Gc is an interval in a direction in which the inner surface 258 and the inner surface 268 are opposed to each other (in the optical axis direction in the present embodiment).

Moreover, a gap Gd (clearance) with a certain length or more is provided between the protruded portion 259 that is the boundary portion between the inner surface 258 and the image-side concave lens surface 253, and the recessed portion 269 that is the boundary portion between the inner surface 268 and the object-side convex lens surface 263. The end of the protruded portion 259 is a protruded curved surface, and the bottom of the recessed portion 269 is a recessed curved surface. Further, the length of the gap Gd (the thickness of the adhesive layer) is, for example, from about 10 μm to about 30 μm. Furthermore, the gap Gd is a gap from the position radially outward of an effective diameter of the lens on the connected surface between the image-side concave lens surface 253 and the object-side convex lens surface 263, to the position of the gap Gc (located radially inward of the opposed portion of the inner surface 268 to the inner surface 258), and the gap Gb is thus structured to gradually increase.

Here, a relational expression Gb<Ga is satisfied by the gap Ga and the gap Gb. Further, a relational expression Ga<Gd<Gc is satisfied by the gaps Ga, Gc, Gd. Thus, in a connecting process described below, in particular, in a curing process of the adhesive, the occurrence of peeling of the adhesive layer 29 (the adhesive) due to a shrinking action caused by curing of the adhesive can be inhibited.

According to the relational expression Gb<Ga, the gap Gb is smaller than the gap Ga; therefore, the object-side convex lens surface 263 and the image-side concave lens surface 253 are not brought into contact and the centering of the lenses can be performed by the opposed portion 256a and the side surfaces 266a located outward of the projections 266.

In addition, the gap Gb also includes a clearance; therefore, a portion of the side surface 266a located outward of the projection 266 and a portion of the opposed portion 256a may brought into contact. However, the entire circumference of the side surface 266a located outward of the projection 266 and the entire circumference of the opposed portion 256a are not brought into contact.

In addition, as described above, the fifth lens 25 and the sixth lens 26 are plastic lenses. The fifth lens 25 is press-fitted to the inner circumferential surface 60 of the lens barrel 3 of resin, and the sixth lens 26 is arranged inside the inner circumferential surface 60 without contacting the inner circumferential surface 60.

(Connecting Process of Cemented Lens)

In the present embodiment, in a series of processes to the connecting of the fifth lens 25 and the sixth lens 26, for example, an application process of applying the adhesive to the image-side concave lens surface 253 of the fifth lens 25 is performed. Next, an overlaying process of overlaying the sixth lens 26 on the fifth lens 25 is performed. As a result, the adhesive expands in the gap between the fifth lens 25 and the sixth lens 26. At this time, the projections 266 are inserted into the adhesive reservoir 256; thereafter, a curing process of curing the adhesive by UV irradiation is performed. Thus, the fifth lens 25 and the sixth lens 26 are connected together with the adhesive.

In the foregoing overlaying process, when the adhesive expands in the gap between the fifth lens 25 and the sixth lens 26, the adhesive is likely to flow out from the gap between the fifth lens 25 and the sixth lens 26 but remains the adhesive reservoir 256. Therefore, the adhesive can be inhibited from flowing out from the gap between the fifth lens 25 and the sixth lens 26. In addition, in the present embodiment, since the three projections 266 are inserted into the adhesive reservoir 256, the adhesive is present in a region between the projections 266 located side by side. In other words, even when the excess adhesive is in an overflow state from the adhesive reservoir 256, the excess adhesive can be stored in the region between the projections 266. Further, the adhesive shrinks in the curing process of the adhesive. At this time, the adhesive is likely to be pulled (shrink) toward the adhesive reservoir 256 having a wide gap (clearance) and thus such shrinkage may cause peeling (interruption of flowing) of the adhesive. However, by increasing the gap (clearance) toward the adhesive reservoir 256, peeling of the adhesive can be inhibited and the occurrence of problems such as diffuse reflection, tarnishing, whitening, and a damage of the cemented lens can be inhibited.

Further, after the foregoing overlaying process, a centering process of the lenses by circumferentially rotating the sixth lens 26 overlaid on the fifth lens 25 may be performed.

The features of the present embodiment described above are summarized as follows. The lens unit 1 includes the wide-angle lens 2 formed of the plurality of lenses, and the lens barrel 3 configured to house the wide-angle lens 2. The wide-angle lens 2 includes the cemented lens 20 in which the second cemented lens element 20b (the fifth lens 25) is connected to the first cemented lens element 20a (the sixth lens 26) via the adhesive layer 29.

The first cemented lens element 20a (the sixth lens 26) is a lens including the object-side convex lens surface 263 facing toward the second cemented lens element 20b (the fifth lens 25), and the first flange 264 surrounding the outer circumference of the object-side convex lens surface 263. The second cemented lens element 20b (the fifth lens 25) is a lens including the image-side concave lens surface 253 connected by the adhesive layer 29 to the object-side convex lens surface 263 of the first cemented lens element 20a (the sixth lens 26), and the second flange 254 surrounding the outer circumference of the image-side concave lens surface 253. One of the first flange 264 and the second flange 254 includes the projections (here, the projections 266 of the first flange 264) protruding toward the other of the first flange 264 and the second flange 254. In addition, the other of the first flange 264 and the second flange 254 (here, the second flange 254) includes the opposed portion 256a formed opposed to the side surfaces 266a of the projections 266. When the gap Ga is provided between the object-side convex lens surface 263 and the image-side concave lens surface 253 and the gap Gb is provided between the side surfaces of the projections and the opposed portion, the following relational expression: Gb<Ga is satisfied by Ga and Gb. Since the gap Gb having a length smaller than the gap Ga (the adhesive layer 29) is present, a gap with a certain length or more is provided between the object-side convex lens surface 263 and the image-side concave lens surface 253 (i.e., between the connection surfaces) and centering of the lenses can be performed by use of the gap Gb. As a result, peeling of the adhesive layer 29 in the gap Ga can be inhibited, and in addition, centering of the lenses can be performed more precisely. Accordingly, the occurrence of problems such as diffuse reflection, tarnishing, whitening, and a damage of the cemented lens due to peeling of the adhesive layer 29 in the gap Ga can be inhibited, and in addition, centering of the lenses can be performed precisely. Therefore, in particular, coma aberration can be desirably corrected and the high resolution of the lens unit 1 can be attained by improvement of optical performance.

The first cemented lens element 20a (the sixth lens 26) and the second cemented lens element 20b (the fifth lens 25) are plastic lenses, and one of the first cemented lens element 20a (the sixth lens 26) and the second cemented lens element 20b (the fifth lens 25) is in contact with the inner circumferential surface 60 of the lens barrel 3 and the other of the first cemented lens element 20a (the sixth lens 26) and the second cemented lens element 20b (the fifth lens 25) is not in contact with the inner circumferential surface 60 of the lens barrel 3. In addition, the clearance (the gap Gb) is present between the side surfaces 266a of the projections 266 and the opposed portion 256a.

The first cemented lens element 20a (the sixth lens 26) and the second cemented lens element 20b (the fifth lens 25) are plastic lenses, and one of the first cemented lens element 20a (the sixth lens 26) and the second cemented lens element 20b (the fifth lens 25) is in contact with the inner circumferential surface 60 of the lens barrel 3 and the other of the first cemented lens element 20a (the sixth lens 26) and the second cemented lens element 20b (the fifth lens 25) is not in contact with the inner circumferential surface 60 of the lens barrel 3. In a case where environmental temperature rises and the cemented lens elements are expanded, one of the cemented lens elements (here, the second cemented lens elements 20b (the fifth lens 25)) is in contact with the inner circumferential surface 60 of the lens barrel 3; therefore, expansion is prevented by the lens barrel 3. Consequently, expansion and distortion occur. The other of the cemented lens elements (here, the first cemented lens element 20a (the sixth lens 26)) is not in contact with the lens barrel 3, therefore being expanded without disturbance by the lens barrel 3. As a result, when the side surfaces 266a of the projections 266 are in contact with the opposed portion 256a, peeling of the adhesive layer is highly likely to occur due to dislocation caused by such expansion. Meanwhile, with the aforementioned structure, when environmental temperature rises, the first cemented lens element 20a (the sixth lens 26) and the second cemented lens elements 20b (the fifth lens 25) expand. Even in such a case, the clearance (the gap Gb) is preset between the side surfaces 266a of the projections 266 and the opposed portion 256a. Therefore, peeling of the adhesive layer due to dislocation caused by the aforementioned expansion can be inhibited.

The other of the first flange 264 and the second flange 254 (here, the second flange 254) includes the adhesive reservoir 256 recessed toward the opposite side to the flange surface. The side surface on the outer side of the adhesive reservoir 256 is the opposed portion 256a opposed to the side surfaces 266a of the projections 266. When the concave lens surface and the convex lens surface (i.e., the object-side convex lens surface 263 of the sixth lens 26 and the image-side concave lens surface 253 of the fifth lens 25) that form the cemented structure are overlaid, the excess adhesive is stored in the adhesive reservoir 256. Therefore, the sufficient amount of adhesive can be applied so that peeling of the adhesive or air bubbles do not occur, and in addition, the adhesive can be prevented from flowing to the outside of the lens.

The adhesive reservoir 256 is circumferentially and continuously formed in an annular shape so as to surround the lens surface of the other of the lenses. Therefore, centering of the lenses can be performed by circumferentially rotating one of the lenses (the sixth lens 26, the connection surface of which is actually the convex lens surface). Further, the adhesive reservoir 256 is formed in an annular shape and thus the adhesive evenly expands toward the flanges (the first flange 264 and the second flange 254); therefore, peeling of the adhesive layer 29 can be further inhibited. In addition, the adhesive can be prevented from leaking circumferentially and throughout the lens to the outside of the lens.

The projections 266 are formed circumferentially at equal intervals at a plurality of locations, for example, three locations. When the excess adhesive is in an overflow state from the adhesive reservoir 256, the excess adhesive can be stored in a space between the projections 266.

The positioning protrusions 267 are formed on one of the first flange 264 and the second flange 254 and located radially outward of the projections 266 or the opposed portion 256a. The positioning protrusions 267 configured to position the first cemented lens element 20a and the second cemented lens element 20b in the optical axis direction are formed protruding toward the other of the first flange 264 and the second flange 254. The adhesive is not applied to the positioning protrusions 267; therefore, the gap between the first cemented lens element 20a and the second cemented lens element 20b in the optical axis direction can be highly precisely controlled.

When the gap Gc is provided between one inner surface located radially inward of the projections and another inner surface located radially inward of the opposed portion and the gap Gd is provided between the boundary portion between the one inner surface and the concave lens surface, and the boundary portion between the other inner surface and the convex lens surface, the following relational expression: Ga<Gd<Gc may be satisfied by Ga, Gc, Gd. The adhesive shrinks when curing. Accordingly, the adhesive is likely to be pulled (shrink) toward the adhesive reservoir 256 having a wide gap (clearance) and thus such shrinkage may cause peeling (interruption of flowing) of the adhesive. Therefore, the gap (clearance) is designed to gradually increase toward the adhesive reservoir 256 and thus peeling of the adhesive can be inhibited. In addition, the occurrence of problems such as diffuse reflection, tarnishing, whitening, and a damage of the cemented lens can be inhibited.

As described above, the present invention is described based on embodiments. The embodiments are illustrated as merely an example. It will be understood by those skilled in the art that various modified examples can be made, for example, by combination of components of the embodiments and that the modified examples are within the scope of the present invention.

Figure 6:
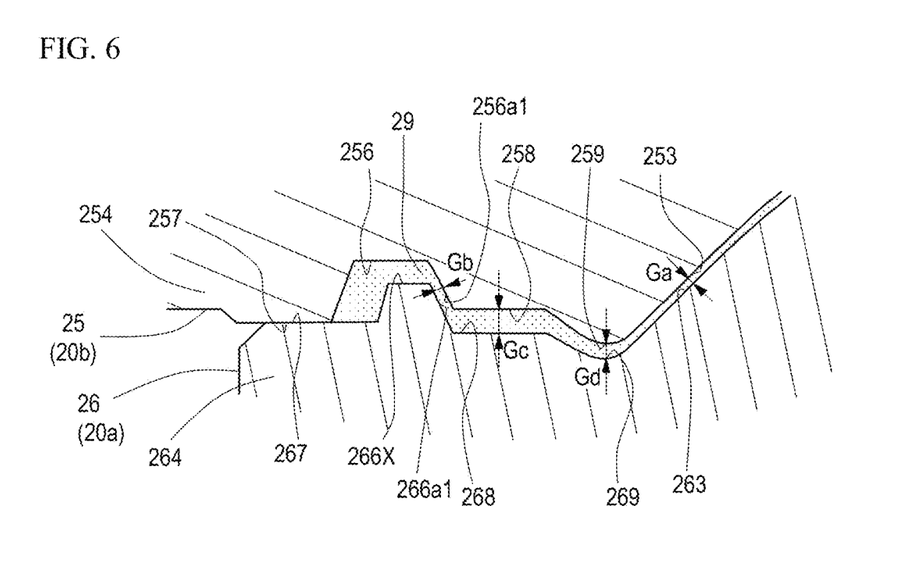
FIG. 6 is a diagram illustrating a connected state of a cemented lens according to a first modified example of the embodiment.

FIG. 6 is a drawing illustrating a connected state of the fifth lens 25 and the sixth lens 26 according to a first modified example and corresponding to FIG. 5. As illustrated, a projection 266X of the sixth lens 26 is located close to the center (the optical axis L) compared to an example of FIG. 5. In other words, an inclined surface of the adhesive reservoir 256 extends outward from the inner surface 258, and the inclined surface is an opposed portion 256a1. The oppose portion 256a1 is opposed to a side surface 266a1 of the projection 266X, and the side surface 266a1 is inclined outward (diagonally upward to the left as illustrated) from the inner surface 268. A clearance between the side surface 266a1 and the opposed portion 256a1 is the gap Gb. Further, in this case, the relational expression Gb<Ga is satisfied by the gap Ga and the gap Gb. In addition, the relational expression Ga<Gd<Gc is satisfied by the gaps Ga, Gc, Gd. As a result, the same effect as the foregoing embodiment can be obtained.

Figure 7A:
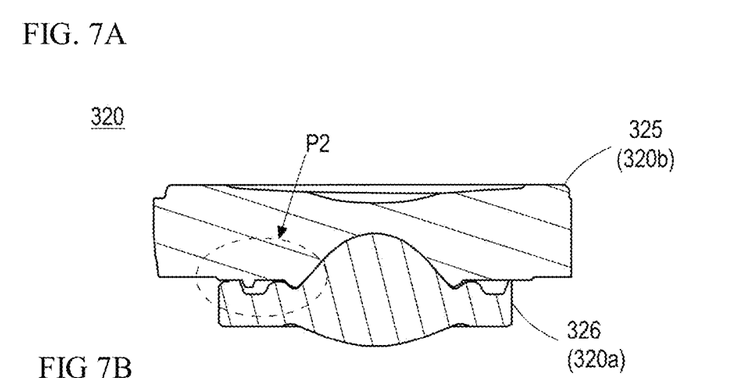
FIG. 7A and FIG. 7B are diagrams each illustrating a cemented lens according to a second modified example of the embodiment.
Figure 7B:
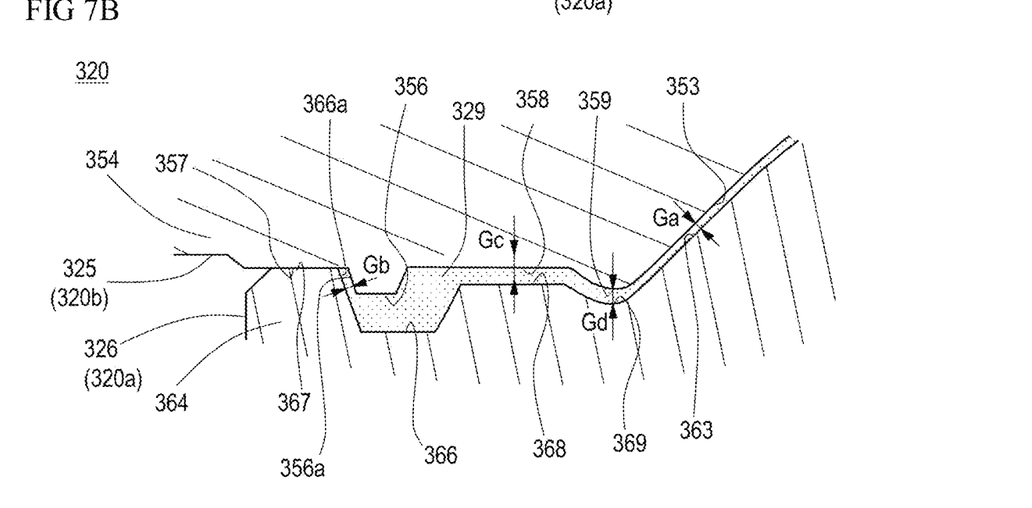

FIG. 7A and FIG. 7B are diagrams each illustrating a cemented lens 320 according to a second modified example. FIG. 7A is a vertical cross-sectional view, and FIG. 7B illustrates a region P2 of FIG. 7A. In the second modified example, a projection 356 is provided on a fifth lens 325 (a second cemented lens element 320b), and an adhesive reservoir 366 is provided in a sixth lens 326 (a first cemented lens element 320a).

In the same way as the foregoing embodiments, the gap Ga (clearance) with a certain length or more is provided between an image-side concave lens surface 353 of the fifth lens 325 (the second cemented lens element 320b) and an object-side concave lens surface 363 of the sixth lens 326 (the first cemented lens element 320a). The fifth lens and the sixth lens are connected by an adhesive layer 329 applied in the gap Ga. A contact surface 357 of a second flange 354 of the fifth lens 325 is brought into contact with a positioning protrusion 367 of a first flange 364 of the sixth lens 326 and thus the fifth lens 325 and the sixth lens 326 are positioned in the optical axis L direction.

Specifically, the adhesive layer 329 is formed in a lens surface connection region in which the object-side convex lens surface 363 and the image-side concave lens surface 353 are opposed and connected to each other, a fitting region in which the projection 356 is fitted into the adhesive reservoir 366, and an intermediate region between the lens surface connection region and the fitting region (in a region in which the inner surface 358 of the fifth lens 325 and the inner surface 368 of the sixth lens 326 are opposed to each other).

An inclined surface located on the outer side of the recessed adhesive reservoir 366 is an opposed portion 366a, and the opposed portion 366a is opposed to a side surface 356a located on the outer side of the projection 356. The clearance (the gap Gb) is present between the opposed portion 366a and the side surface 356a located on the outer side of the projection 356.

The gap Gc (clearance) with a certain length or more is provided between the inner surface 358 (one inner surface) located radially inward of the projection 356 (the adhesive reservoir 366) and the inner surface 368 (another inner surface) located inward of the opposed portion 366a of the adhesive reservoir 366.

In addition, the gap Gd (clearance) with a certain length or more is provided between a protruded portion 359 that is a boundary portion between the inner surface 358 and the image-side concave lens surface 353, and a recessed portion 369 that is a boundary portion between the inner surface 368 and the object-side convex lens surface 363.

Further, in this case, the relational expression Gb<Ga is satisfied by the gap Ga and the gap Gb. In addition, the relational expression Ga<Gd<Gc is satisfied by the gaps Ga, Gc, Gd. As a result, the same effect as the foregoing embodiment and the foregoing first modified example can be obtained.

In addition, in the foregoing embodiment and the first and second modified examples, the positioning protrusions 267, 367 are formed on the first flange 264, 364. Alternatively, positioning protrusions may be formed on the second flange 254, 354.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens unit, comprising:
a plurality of lenses; and
a lens barrel configured to house the plurality of lenses,
wherein the plurality of lenses comprises a cemented lens comprising a first cemented lens element and a second cemented lens element connected to the first cemented lens element via an adhesive layer,
the first cemented lens element comprises a convex lens surface facing toward the second cemented lens element, and a first flange surrounding an outer circumference of the convex lens surface,
the second cemented lens element comprises a concave lens surface connected to the convex lens surface of the first cemented lens element by the adhesive layer, and a second flange surrounding an outer circumference of the concave lens surface,
one of the first flange and the second flange comprises a projection protruding toward an other of the first flange and the second flange,
the other of the first flange and the second flange comprises an opposed portion opposed to a side surface of the projection, and
a first gap having a dimension Ga is provided between the convex lens surface and the concave lens surface, and a second gap having a dimension Gb is provided between the side surface of the projection and the opposed portion, and the following relational expression: Gb<Ga is satisfied by Ga and Gb, and
a third gap having a dimension Gc is provided between one inner surface located radially inward of the projection and another inner surface located inward of the opposed portion, and a fourth gap having a dimension Gd is provided between a boundary portion between the one inner surface and the concave lens surface, and a boundary portion between the other inner surface and the convex lens surface, and the following relational expression: Ga<Gd<Gc is satisfied by Ga, Gc, Gd, and the projection is formed at a plurality of locations spaced apart circumferentially at intervals.

2. The lens unit according to claim 1, wherein
the first cemented lens element and the second cemented lens element are plastic lenses,
one of the first cemented lens element and the second cemented lens element is in contact with an inner circumferential surface of the lens barrel, and an other of the first cemented lens element and the second cemented lens element is not in contact with the inner circumferential surface of the lens barrel, and
the second gap is present between the side surface of the projection and the opposed portion.

3. The lens unit according to claim 1, wherein
an adhesive reservoir recessed toward an opposite side to one of the first flange and the second flange is formed in an other of the first flange and the second flange, and
a side surface of the adhesive reservoir is the opposed portion opposed to the side surface of the projection.

4. The lens unit according to claim 3, wherein the adhesive reservoir is circumferentially and continuously formed in an annular shape so as to surround the lens surface of the other of the first cemented lens element and the second cemented lens element.

5. The lens unit according to claim 1, wherein a positioning protrusion is formed on one of the first flange and the second flange and located radially outward of the projection or the opposed portion, the positioning protrusion protruding toward an other of the first flange and the second flange and positioning the first cemented lens element and the second cemented lens element in an optical axis direction.

6. The lens unit according to claim 1, wherein
an adhesive reservoir recessed toward an opposite side to one of the first flange and the second flange is formed in an other of the first flange and the second flange, and
a side surface of the adhesive reservoir is the opposed portion opposed to the side surface of the projection.

7. The lens unit according to claim 6, wherein a positioning protrusion is formed on one of the first flange and the second flange and located radially outward of the projection or the opposed portion, the positioning protrusion protruding toward an other of the first flange and the second flange and positioning the first cemented lens element and the second cemented lens element in an optical axis direction.

8. The lens unit according to claim 7, wherein
the first cemented lens element and the second cemented lens element are plastic lenses,
one of the first cemented lens element and the second cemented lens element is in contact with an inner circumferential surface of the lens barrel, and an other of the first cemented lens element and the second cemented lens element is not in contact with the inner circumferential surface of the lens barrel, and
the second gap is present between the side surface of the projection and the opposed portion.

9. A cemented lens, comprising:
a first cemented lens element and a second cemented lens element connected to the first cemented lens element via an adhesive layer, wherein
the first cemented lens element comprises a convex lens surface facing toward the second cemented lens element, and a first flange surrounding an outer circumference of the convex lens surface,
the second cemented lens element comprises concave lens surface connected to the convex lens surface of the first cemented lens element by the adhesive layer, and a second flange surrounding an outer circumference of the concave lens surface, one of the first flange and the second flange comprises a projection protruding toward an other of the first flange and the second flange, the other of the first flange and the second flange comprises an opposed portion opposed to a side surface of the projection, and a first gap having a dimension Ga is provided between the convex lens surface and the concave lens surface, and a second gap having a dimension Gb is provided between the side surface of the projection and the opposed portion, and the following relational expression: Gb<Ga is satisfied by Ga and Gb, and a third gap having a dimension Gc is provided between one inner surface located radially inward of the projection and another inner surface located inward of the opposed portion, and a fourth gap having a dimension Gd is provided between a boundary portion between the one inner surface and the concave lens surface, and a boundary portion between the other inner surface and the convex lens surface, and the following relational expression: Ga<Gd<Gc is satisfied by Ga, Gc, Gd, and the projection is formed at a plurality of locations spaced apart circumferentially at intervals.

10. The cemented lens according to claim 9, wherein an adhesive reservoir recessed toward an opposite side to one of the first flange and the second flange is formed in an other of the first flange and the second flange, and a side surface of the adhesive reservoir is the opposed portion opposed to the side surface of the projection.

11. The cemented lens according to claim 10, wherein a positioning protrusion is formed on one of the first flange and the second flange and located radially outward of the projection or the opposed portion, the positioning protrusion protruding toward an other of the first flange and the second flange and positioning the first cemented lens element and the second cemented lens element in an optical axis direction.

* * * * *